(12) United States Patent
Frei et al.

(10) Patent No.: US 11,511,497 B2
(45) Date of Patent: Nov. 29, 2022

(54) WELDING UNIT

(71) Applicant: CLOSAC AG, Grabs (CH)

(72) Inventors: Christian Frei, Oberriet (CH); Remo Jud, Gonten (CH); Marcel Kilga, Hohenems (AT)

(73) Assignee: CLOSAC AG, Grabs (CH)

( * ) Notice: Subject to any disclaimer, the term of this patent is extended or adjusted under 35 U.S.C. 154(b) by 0 days.

(21) Appl. No.: 17/594,024

(22) PCT Filed: Apr. 9, 2020

(86) PCT No.: PCT/EP2020/060295
§ 371 (c)(1),
(2) Date: Sep. 30, 2021

(87) PCT Pub. No.: WO2020/208213
PCT Pub. Date: Oct. 15, 2020

(65) Prior Publication Data
US 2022/0118717 A1  Apr. 21, 2022

(30) Foreign Application Priority Data

Apr. 12, 2019 (DE) .......................... 102019109687.1

(51) Int. Cl.
*B29C 65/00* (2006.01)
*B29C 65/50* (2006.01)
*B29L 31/00* (2006.01)

(52) U.S. Cl.
CPC .......... *B29C 66/8122* (2013.01); *B29C 65/50* (2013.01); *B29L 2031/7694* (2013.01)

(58) Field of Classification Search
CPC ........................... B29C 65/50; B29C 66/8122
See application file for complete search history.

(56) References Cited

U.S. PATENT DOCUMENTS

| 2,671,906 | A | * | 3/1954 | Potts | .................... | A47K 11/026 |
| | | | | | | 53/548 |
| 3,401,409 | A | * | 9/1968 | Ekrut | ................... | A47K 11/026 |
| | | | | | | 4/484 |
| 3,452,368 | A | * | 7/1969 | Couper | ................ | A47K 11/026 |
| | | | | | | 53/567 |

(Continued)

FOREIGN PATENT DOCUMENTS

| CH | 581462 A5 | 11/1976 |
| DE | 2340078 A1 | 2/1975 |

(Continued)

OTHER PUBLICATIONS

EP 3,130,447 spec English translation (Year: 2016).*

(Continued)

*Primary Examiner* — Philip C Tucker
*Assistant Examiner* — Nickolas R Harm
(74) *Attorney, Agent, or Firm* — Christopher J. Volkmann; Kelly, Holt & Christenson, PLLC

(57) ABSTRACT

The invention relates to a welding unit (1) for the welding of film tubes for a waterless toilet, the welding unit (1) comprising welding jaws (2, 3), the welding jaws (2, 3) comprising welding means covers (4, 5), characterized in that the welding means covers (4, 5) are detachably arranged on the welding jaws (2, 3), in particular are detachably connected to the welding jaws (2, 3).

14 Claims, 3 Drawing Sheets

(56) References Cited

U.S. PATENT DOCUMENTS

| | | | | |
|---|---|---|---|---|
| 3,648,302 A | * | 3/1972 | Winters | A47K 11/026 4/484 |
| 3,665,522 A | * | 5/1972 | Backlund | A47K 11/026 4/484 |
| 2010/0282417 A1 | * | 11/2010 | Damm | B30B 5/02 156/583.3 |
| 2012/0080418 A1 | | 4/2012 | Sakamoto et al. | |
| 2015/0164293 A1 | | 6/2015 | Shimanuki et al. | |
| 2016/0324377 A1 | * | 11/2016 | Morris | A47K 11/026 |

FOREIGN PATENT DOCUMENTS

| | | |
|---|---|---|
| DE | 2340557 A1 | 3/1975 |
| DE | 69823349 T2 | 5/2005 |
| EP | 3130447 A1 | 2/2017 |
| GB | 1164368 A | 9/1969 |
| GB | 1424498 A | 2/1976 |
| GB | 1445509 A | 8/1976 |
| GB | 1516206 A | 6/1978 |

OTHER PUBLICATIONS

International Search Report and Written Opinion for International Patent Application No. PCT/EP2020/060295, dated Aug. 28, 2020, date of filing: Apr. 9, 2020, 13 pages with English Translation of Search Report.
Office Action for German Patent Application No. 102019109687.1 dated Dec. 10, 2019, 5 pages.
International Preliminary Report on Patentability for International Patent Application No. PCT/EP2020/060295, dated Sep. 28, 2021, 7 pages.

* cited by examiner

WELDING UNIT

CROSS-REFERENCES TO RELATED APPLICATIONS

This Application is a Section 371 National Stage Application of International Application No. PCT/EP2020/060295, filed Apr. 9, 2020, and published as WO/2020/208213 A1 on Oct. 15, 2020, and claims priority to German Application No. 102019109687.1, filed Apr. 12, 2019, the contents of both are hereby incorporated by reference in their entirety.

DETAILED DESCRIPTION OF THE DRAWINGS

Figure 1:
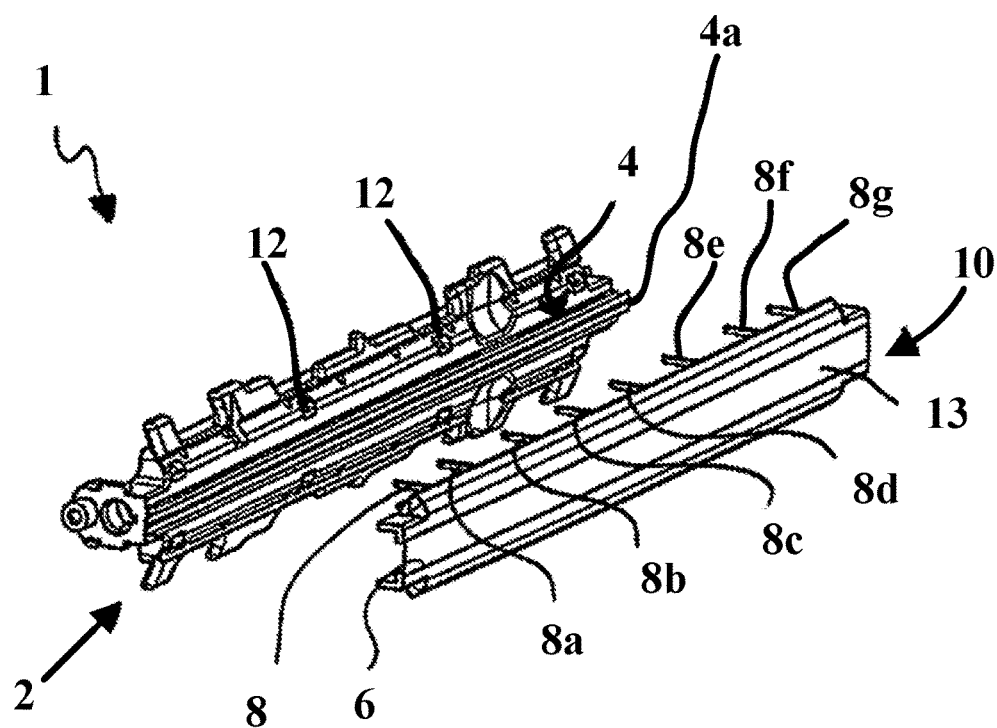
FIG. 1 shows a detail of a schematic illustration of a welding unit according to the invention.

The invention relates to a welding unit according to the preamble of claim 1.

Welding units for the welding of film tubes for a waterless toilet are known. The problem with known welding units is that the welding means usually have to be provided with covers in order to ensure a simple and process-reliable detachment of, for example, films or film tubes. These welding means covers are subject to wear and tear and have to be exchanged with increased effort, in which case the complete welding jaw may have to be replaced. This can be associated with correspondingly high costs.

It is an object of the invention to provide an improved welding unit in which a simplified exchange of the welding means covers is made possible.

To achieve the object, it is proposed, based on a welding unit for the welding of film tubes for a waterless toilet, the welding unit comprising welding jaws, the welding jaws comprising welding means, that the welding means covers are detachably arranged on the welding jaws, in particular are connected to the welding jaws.

In this way, a significantly simplified exchange of the welding means covers can be made possible, which, if necessary, can even be carried out by the user, for example an end user.

In an advantageous development of the invention, provision may be made for the welding means covers to be connected to the welding jaws in a form-fitting manner.

The detachment of a form-fitting connection generally does not require any special aids or only those that are usually available to a user. For example, simple lever tools or just the strength of a user's hands are often sufficient. In addition to simplified exchange, this also enables stable fastening of the welding means covers to the welding jaws.

A further preferred refinement of the invention may provide that the welding means covers each comprise a frame element, the frame elements being configured as plug-in frame elements and comprising plug-in means which are arranged in apertures of the welding jaws.

Since the welding means covers usually have special non-stick coatings in the form of surface coatings or tapes on the contact side with the films to be welded, a frame element is advantageous for providing the necessary stability of the welding means cover. In addition to a significantly simplified exchange possibility, stable fastening of the welding means covers to the welding jaws can be made possible.

In an advantageous refinement of the invention, provision may be made for the welding means covers to be configured as welding means covers which can be cut to length manually.

The welding means can thus be provided in a simple manner in accordance with the required dimension, that is to say length or width. To this end, provision is made for the welding means covers to be equipped with all the components, for example latching hooks or other fastening means, periodically or continuously in the longitudinal direction, such that simple manual cutting to length, for example cutting to the required length, is made possible.

In an advantageous refinement of the invention, provision may be made for the welding means covers to be configured as PTFE covers, in particular as woven glass fabric tapes coated with PTFE.

In this way, particularly efficient welding of the film tubes can be achieved with simultaneous process-reliable detachability of the welded films from the welding jaws. Such tapes can also be readily cut and separated by hand and do not represent a sensitive item that is particularly complex to deal with during handling and assembly.

Provision is usually made for welding means to be configured on the welding unit, the welding means for each welding jaw particularly preferably being configured as a single beaded tape for separation or cutting and welding or connection by fusing.

Contrary to the prior art, which provides a welding wire for the separation and two parallel heating tapes for the welding, only a single beaded tape is provided in the present case which can both weld and separate, depending on how the operating temperature is set via open-loop or closed-loop control.

In this way, the separation and welding can be carried out with a smaller number of components, as a result of which the welding means are less prone to faults.

Furthermore, provision is preferably made for the welding means covers to comprise hooks, and for the hooks to latch into place as flexible latching elements on the welding jaw.

Hooks form a simple, known fastening for the exchangeable welding means covers that is process-reliable when being attached due to the feedback of the latching-in-place.

A further preferred embodiment provides that the welding jaw comprises at least one indentation in order to make it possible for a force-fitting and/or form-fitting connection between the welding jaw and the welding means cover to be detached in a levered manner by the engagement of a tool.

The invention also provides a waterless toilet, which is characterized in that it comprises a welding unit according to the invention.

The advantages stated above apply analogously in this case.

Figure 2:
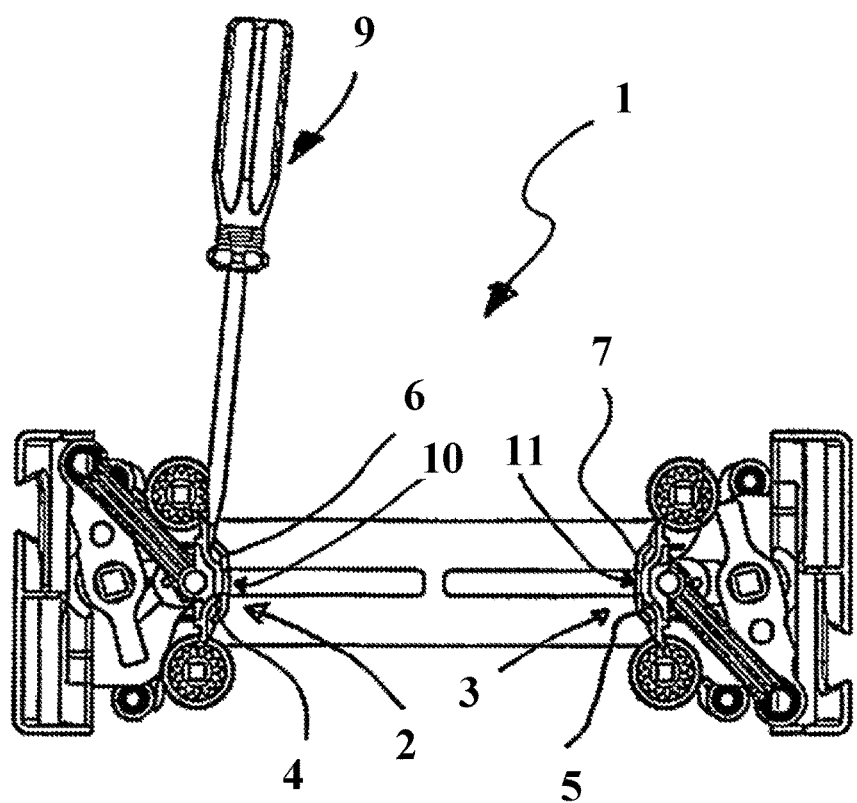
FIG. 2 shows the welding unit shown in FIG. 1 in a schematic sectional illustration.

FIGS. 1 and 2 each illustrate a welding unit 1 for the welding of film tubes (not shown) for a waterless toilet (not shown). The welding unit 1 comprises a welding jaw 2. The welding jaws 2 comprise a welding means 4 and a beaded tape 4a (see FIG. 2 for corresponding components 3, 5). The welding means 4, 5 are configured for the welding of film tubes.

In the context of the invention, provision is made for the welding means 4, 5 to be provided with welding means covers 10, 11 which are detachably fastened to the welding jaws 2, 3. to be arranged, in particular connected to the welding jaws 2, 3. This is shown in more detail in FIG. 2. The detachable connection of the welding means covers 10, 11 on or to the welding jaws 2, 3 makes it possible for the welding means covers 10, 11 to be able to be exchanged in a simple manner.

In the present case, welding means covers 10, 11 are connected to the welding jaws 2, 3 in a form-fitting manner. In particular, the welding means covers 10, 11 each comprise a frame element 6, 7, the frame elements 6, 7 being configured as plug-in frame elements 6, 7 and comprising plug-in means 8, 8a-g (see FIG. 1) which are latched in place in apertures of the welding jaws 2, 3. In the present case, the plug-in means 8 are configured as latching hooks (see FIG. 3). They are preferably formed in one piece with the frame element 6 on its upper and lower longitudinal side at periodic intervals.

As shown in FIG. 2, the frame elements 6, 7 and thus the welding means covers 10, 11 can be detached from the welding jaws 2, 3 with little effort, for example with a screwdriver or similar tool 9. To this end, an indentation 12 is provided in the welding jaws 2, 3, which makes it possible to engage behind the welding means covers 10, 11 to a satisfactory extent in order to develop the leverage effect in the longitudinal direction of the latching hooks 8.

Here, the frame elements 6, 7 are also distinguished by the fact that they can be produced in a simple manner and enable uniform and stable fastening of the welding means covers 10, 11 over an entire length of the welding jaws 2, 3.

Figure 3:
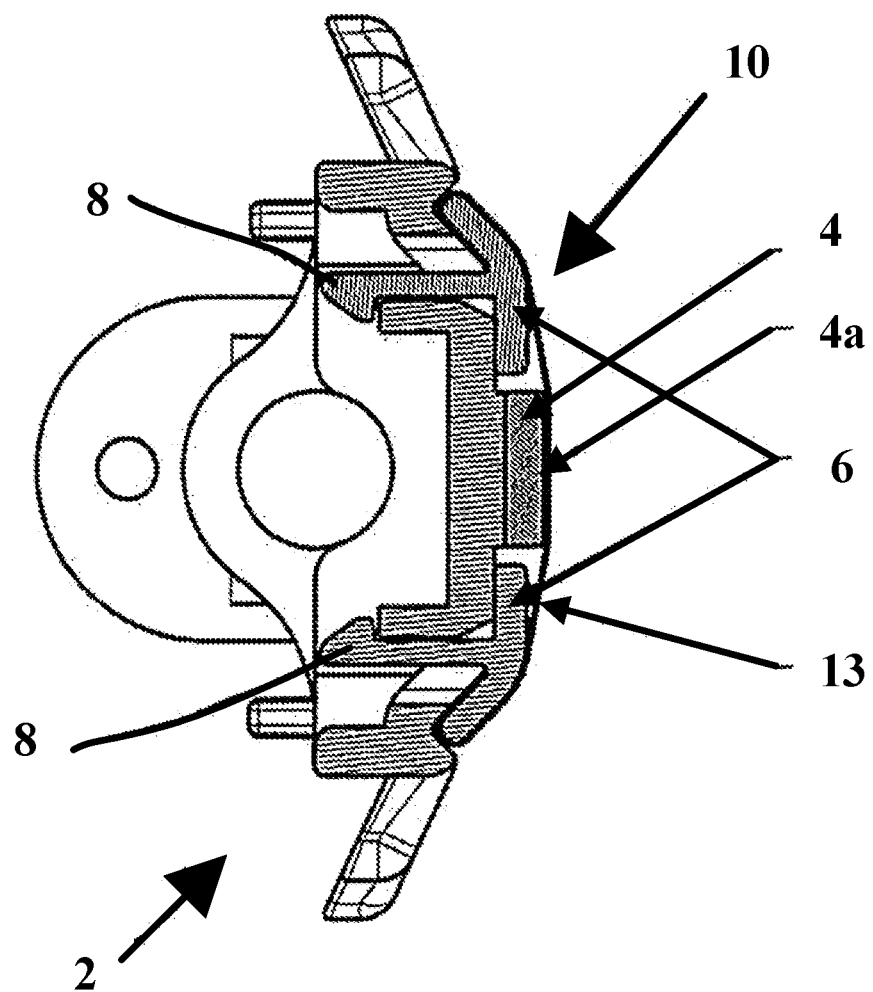
FIG. 3 shows a section through a welding jaw in a schematic representation.

In FIG. 3, it can moreover be seen that a PTFE-coated woven glass fabric tape 13 is stretched over the frame element 6. In this case, the PTFE-coated woven glass fabric tape 13 is preferably adhesively bonded to the frame element 6 as carrier and can be cut to length, together with the frame element 6, by the user with simple means, for example sturdy scissors or the like.

Although the present invention has been described with reference to preferred embodiments, workers skilled in the art will recognize that changes may be made in form and detail without departing from the spirit and scope of the invention.

LIST OF REFERENCE DESIGNATIONS

1 Welding unit
2 Welding jaws
3 Welding jaws
4 Welding means
5 Welding means
6 Frame element
7 Frame element
8 Plug-in means
8a Plug-in means
8b Plug-in means
8c Plug-in means
8d Plug-in means
8e Plug-in means
8f Plug-in means
8g Plug-in means
9 Tool
10 Welding means cover
11 Welding means cover
12 Indentation
13 PTFE woven glass fabric tape

The invention claimed is:

1. A welding unit for the welding of film tubes for a waterless toilet, the welding unit comprising welding, jaws, the welding jaws comprising welding means covers, that are detachably arranged on the welding jaws, wherein the welding means covers are detachably connected to the welding jaws, and the welding unit comprises a single beaded tape for separation or cutting and welding or connection by fusing.

2. The welding unit of claim 1, wherein the welding means covers are connected to the welding jaws in a form-fitting manner by of latching connections.

3. The welding unit of claim 2, wherein the welding means covers each comprise a frame element, the frame elements being configured as plug-in frame elements and comprising plug-in means which are arranged in apertures of the welding jaws.

4. The welding unit of claim 1, wherein the welding means covers can be cut to length.

5. The welding unit of claim 1, wherein the welding means covers comprise woven glass fabric tapes coated with PTFE.

6. The welding unit of claim 1, wherein the welding means covers comprise hooks, and the hooks latching into place as flexible latching elements on at least one of the welding jaws.

7. The welding unit of claim 1, wherein at least one of the welding jaws comprises at least one indentation such that a force-fitting and/or form-fitting connection between the at least one welding jaw and the welding means covers to be detached in a levered manner by the engagement of a tool.

8. A waterless toilet comprising:
a plurality of film tubes;
a welding unit configured to weld two or more of the plurality of film tubes together, the welding unit comprising welding jaws, the welding jaws comprising welding means covers, that are detachably arranged on the welding jaws, wherein the welding means covers are detachably connected to the welding jaws, and the welding unit comprises a single beaded tape for separation or cutting and welding or connection by fusing.

9. The waterless toilet of claim 8, wherein the welding means covers are connected to the welding jaws in a form-fitting manner by latching connections.

10. The waterless toilet of claim 9, wherein the welding means covers each comprise a frame element, the frame elements being configured as plug-in frame elements and comprising plug-in means which are arranged in apertures of the welding jaws.

11. The waterless toilet of claim 8, wherein the welding means covers can be cut to length.

12. The waterless toilet of claim 8, wherein the welding means covers comprise woven glass fabric tapes coated with PTFE.

13. The waterless toilet of claim 8, wherein the welding means covers comprise hooks, and the hooks latching into place as flexible latching elements on at least one of the welding jaws.

14. The waterless toilet of claim 8, wherein at least one of the welding jaws comprises at least one indentation such that a force-fitting and/or form-fitting connection between the at least one welding jaw and the welding means covers to be detached in a levered manner by the engagement of a tool.

* * * * *